United States Patent
Wang

(10) Patent No.: US 10,966,433 B2
(45) Date of Patent: Apr. 6, 2021

(54) STUFFING FILLING AND GAS CHARGING SYSTEM OF DOUGH FOOD PRODUCT PROCESSING MACHINE

(71) Applicant: ANKO FOOD MACHINE CO., LTD., New Taipei (TW)

(72) Inventor: Li-Hsien Wang, New Taipei (TW)

(73) Assignee: ANKO FOOD MACHINE CO., LTD., New Taipei (TW)

( * ) Notice: Subject to any disclaimer, the term of this patent is extended or adjusted under 35 U.S.C. 154(b) by 19 days.

(21) Appl. No.: 16/421,483

(22) Filed: May 24, 2019

(65) Prior Publication Data
US 2020/0367511 A1 Nov. 26, 2020

(51) Int. Cl.
| | |
|---|---|
| A21C 11/16 | (2006.01) |
| A21C 11/20 | (2006.01) |
| A21C 9/06 | (2006.01) |
| A23P 30/25 | (2016.01) |
| A21C 11/10 | (2006.01) |

(52) U.S. Cl.
CPC .......... *A21C 11/163* (2013.01); *A21C 9/061* (2013.01); *A21C 11/10* (2013.01); *A21C 11/20* (2013.01); *A23P 30/25* (2016.08)

(58) Field of Classification Search
None
See application file for complete search history.

(56) References Cited

U.S. PATENT DOCUMENTS 3,751,202 A * 8/1973 Coleman ............ A22C 13/0003
53/140
2017/0064967 A1* 3/2017 Wang ..................... A21C 5/003

FOREIGN PATENT DOCUMENTS

GB            2297936 A  *  8/1996  ............. A23L 7/122

* cited by examiner

*Primary Examiner* — Marc C Howell
*Assistant Examiner* — John J Derusso
(74) *Attorney, Agent, or Firm* — Leong C. Lei

(57) ABSTRACT

A stuffing filling and gas charging system of a dough food product machine is arranged between a stuffing feeding unit and a dough feeding unit of the dough food product machine and includes a stuffing conveyance pipe, and a shaft sleeve, a dough driving rod, and a screw rod support enclosure sleeved over the stuffing conveyance pipe. A first passage is formed between the shaft sleeve and the stuffing conveyance pipe; a second passage is formed between the dough driving rod and the stuffing conveyance pipe; and a third passage is formed between the screw rod support enclosure and the stuffing conveyance pipe. The passages are in communication with each other and are connected to a gas supply unit, so that air flow is introduced into a dough skin during the dough skin being shaped to prevent the dough skin from wrinkling and collapsing before being properly shaped.

7 Claims, 7 Drawing Sheets

STUFFING FILLING AND GAS CHARGING SYSTEM OF DOUGH FOOD PRODUCT PROCESSING MACHINE

TECHNICAL FIELD OF THE INVENTION

The present invention relates generally to a stuffing filling and gas charging system of a dough food product processing machine, and more particularly to a stuffing filling and gas charging system that is particularly applicable to a stuffed dough food product machine that helps keep a covering dough skin in an un-collapsed condition so that an operation of filling stuffing can be carried out smoothly and a stuffed dough food product may look fully filled and pleasing and taste delicious.

DESCRIPTION OF THE PRIOR ART

One of the most widely applications of a dough food product machines is a stuffed dough food product, such as a dumpling machine and machines for processing other stuffed dough food products. Such machines generally have a structural configuration that, as shown in FIG. 6, comprises a machine body 90, in which a power unit is arranged. A control unit 92 monitors and controls a stuffing feeding unit 91 to feed, in a direction from a top side toward a bottom side, a stuffing material 82 for conveying horizontally (rightward as shown in the drawing) to a dough feeding unit 93, where a stuffing material 82 that has been well blended is filled into an interior of the dough skin 83 (as shown in FIG. 7), followed by cutting and sealing with a shaping unit 94 to form a stuffed dough food product, such as a dumpling 95. This invention is provided to overcome or alleviate a bottleneck after a stuffing material is fed by the stuffing feeding unit 91 into the dough feeding unit 93.

Referring to FIGS. 6 and 7, the dough feeding unit 93 is provided with a dough trough 931. The dough trough 931 receives a stuffing conveyance pipe 70 that extends from the stuffing feeding unit 91 to mount therein. The stuffing conveyance pipe 70 is sleeved with a dough driving rod 71. The dough driving rod 71 is located outside the stuffing conveyance pipe 70 and is driven by the power unit to rotate outside the stuffing conveyance pipe 70, so that a dough block 84 falls down from a top side of the dough trough 931 is kneaded and pushed by a blade 72 of the dough driving rod 71 into a dough discharge tube 932 to move through an extrusion nozzle 933, which compresses the dough block 84 into a dough skin 83 that is then discharged. The stuffing material 82 is supplied through the stuffing conveyance pipe 70 to fill an interior of the dough skin 83, followed by being cut and sealed by the shaping unit 94 to form the dumpling 95.

The most commonly known shortcomings in use of the prior art devices are as follows:

(1) As shown in FIG. 7, when the dough skin 83 is extruded out through the extrusion nozzle 933, due to various factors, including gravity, dough skin tension, and air pressure (vacuum), the dough skin 83 that is so extruded in a tubular form suffers convergence and closing of the tubular dough skin 83. Thus, the stuffing material 82, when coining out from the stuffing conveyance pipe 70, the surface of the dough skin 83 may severely wrinkle, leading poor outside appearance and irregularity of thickness of the dough skin 83, and also making it hard for the stuffing material 82 to fill into (a collapsed tube of) the dough skin 83 and thus making the food taste bad, eventually making the stuffed dough food product not in a fully filled condition like that of a hand-made product. This is the primary shortcoming.

(2) The prior art device is designed to produce a tubular dough skin 83 on the outside and the stuffing material 82 filled in the interior thereof. It is not possible, in a preprocessing operation of the stuffing material 82 in the stuffing feeding unit 91, to add color or seasonings. This imposes constraints to the applications of the dough food product machine. This is another shortcoming of the prior art.

SUMMARY OF THE INVENTION

The primary objective of the present invention is to overcome or alleviate problems of a prior art stuffing filling and gas charging system of a dough food product machine that when a dough skin is being shaped, it is often that the dough skin gets collapsed so as to reduce an effect of filling of the stuffing material and this is overcome by providing passages between a stuffing conveyance pipe 10 and a shaft sleeve, a dough driving rod, and a screw rod support enclosure such that the passages allow a flow of gas or air to fill into the dough skin that is being shaped by means of natural air intake or by being connected to a gas supply unit, so that the dough skin is prevented from wrinkling and collapsing and the outside appearance of a stuffed dough food product looks fully filled and the taste and elasticity of the dough food product are improved.

Another objective of the present invention is to overcome or alleviate a shortcoming of a prior art stuffing filling and gas charging system of a dough food product machine that the flavor and color of a stuffing material cannot be individually added or adjusted and this is overcome by providing a passage between a stuffing conveyance pipe and each of a shaft sleeve, a dough driving rod, and a screw rod support enclosure, with the passages being connected to a gas supply unit and operable in combination with a material injection unit, so that a flow of air or gas may be introduced during a dough skin being shaped and additive materials (such as oil, eatable pigments, or spicy seasonings) can be added to help improve material feeding or enhancing color and taste of the stuffing material.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
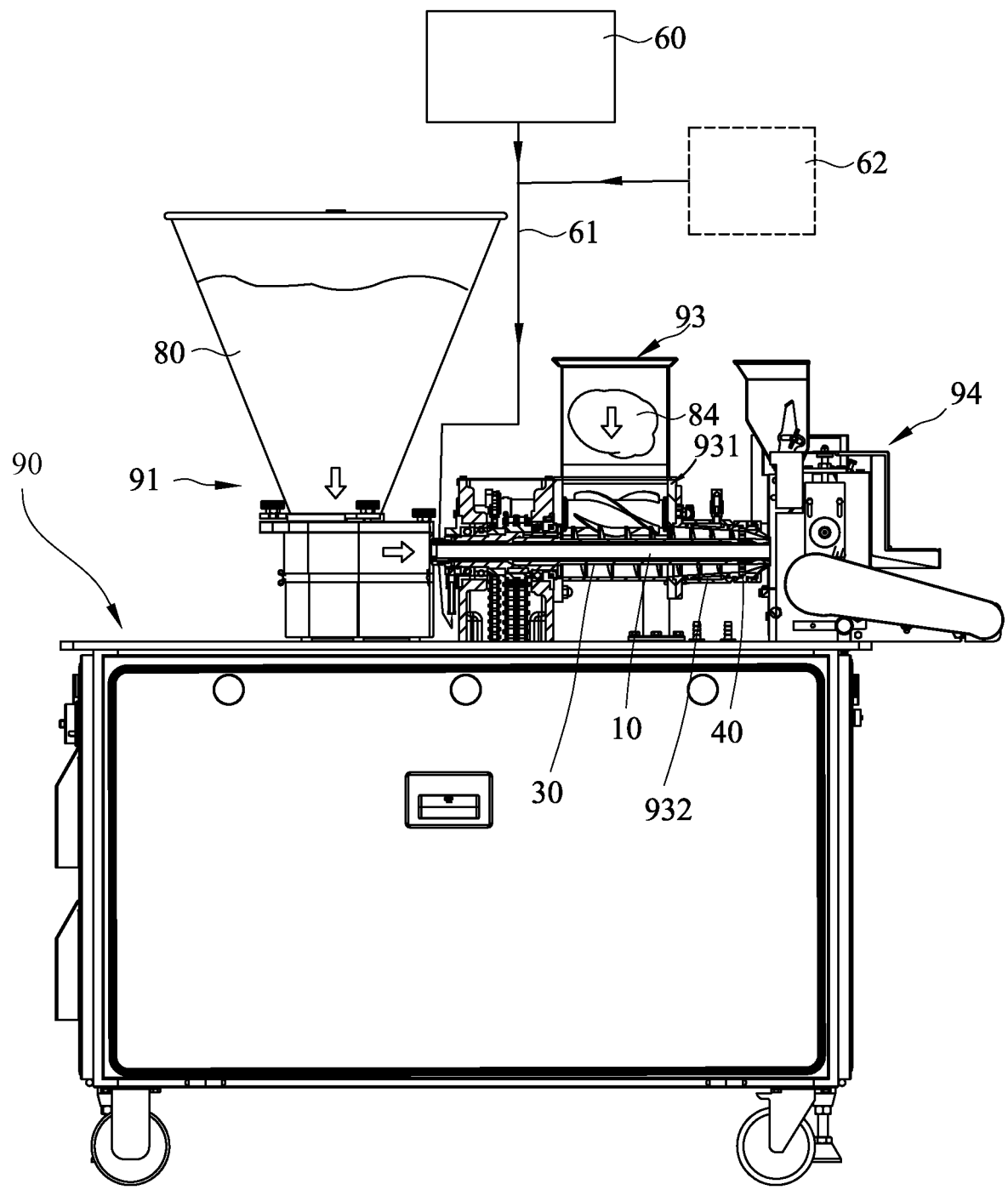
FIG. 1 is a schematic view illustrating an application of the present invention.
Figure 2:
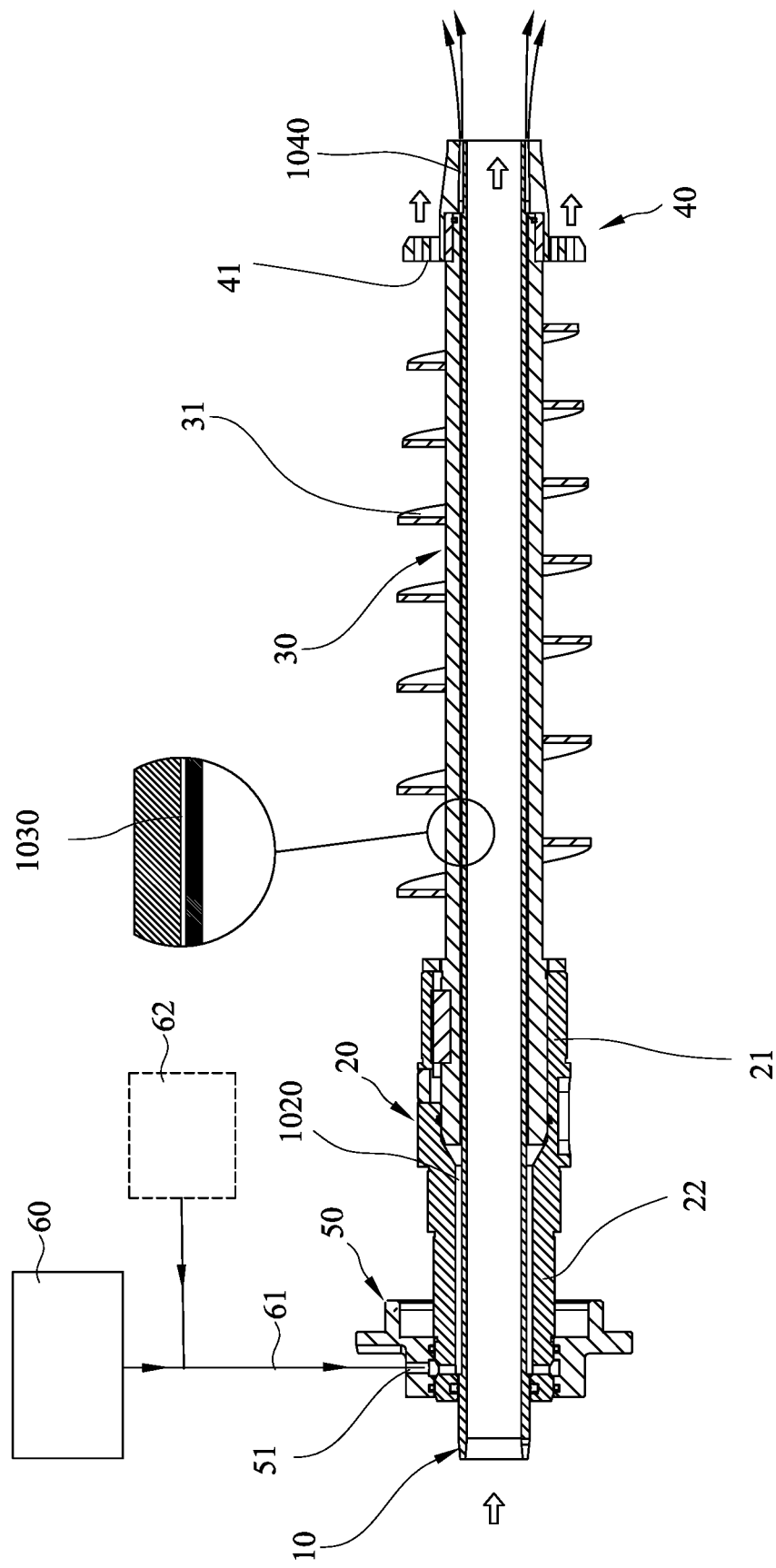
FIG. 2 is a schematic view illustrating a structure of a stuffing filling and gas charging system of the present invention.
Figure 3:
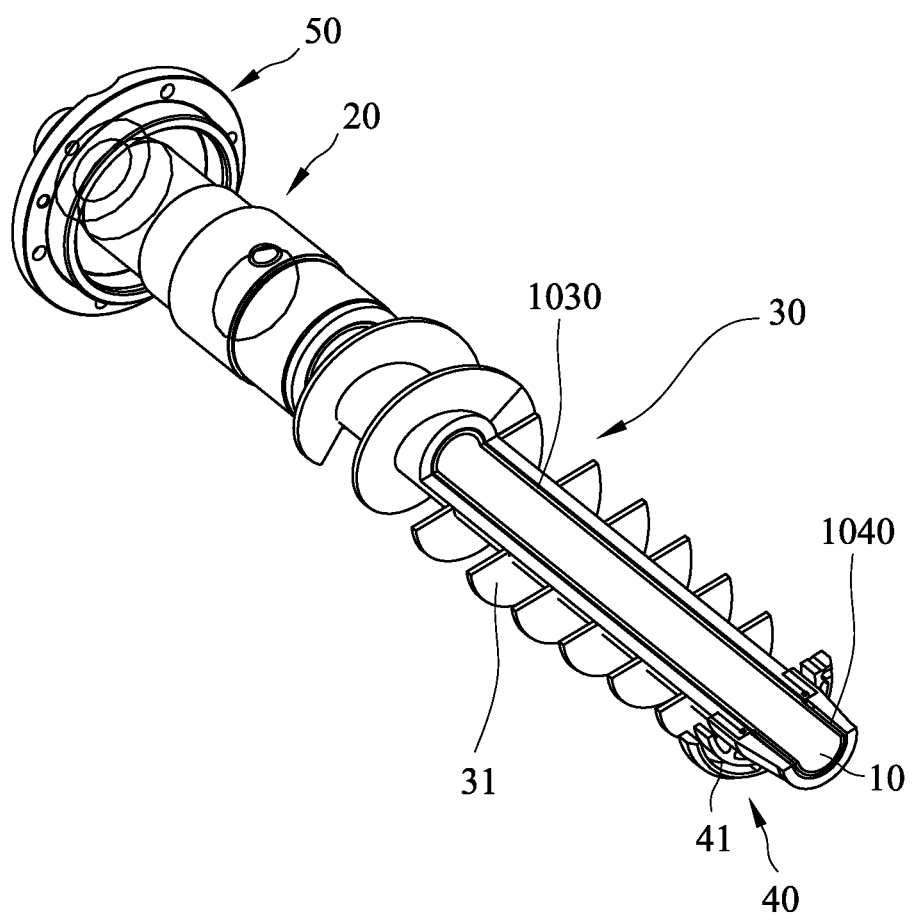
FIG. 3 is a schematic view, partly broken, illustrating the stuffing filling and gas charging system of the present invention.

Referring to FIGS. 1, 2, and 3, the present invention at least comprises:

a stuffing conveyance pipe 10, which is arranged to extend under a dough feeding unit 93 of a dough food product machine and has an end connected to a stuffing feeding unit 91 and an opposite end connected to a shaping unit 94 of the dough food product machine; and a shaft sleeve 20, which is sleeved over a section of the stuffing conveyance pipe 10 that extends through the dough feeding unit 93, the shaft sleeve 20 having an end forming a coupling section 22 and received in and mounted to a sealing flange 50, and arranged under a transmission area of the dough feeding unit 93, the shaft sleeve 20 having an opposite end that is provided with a fitting seat 21.

Figure 5:
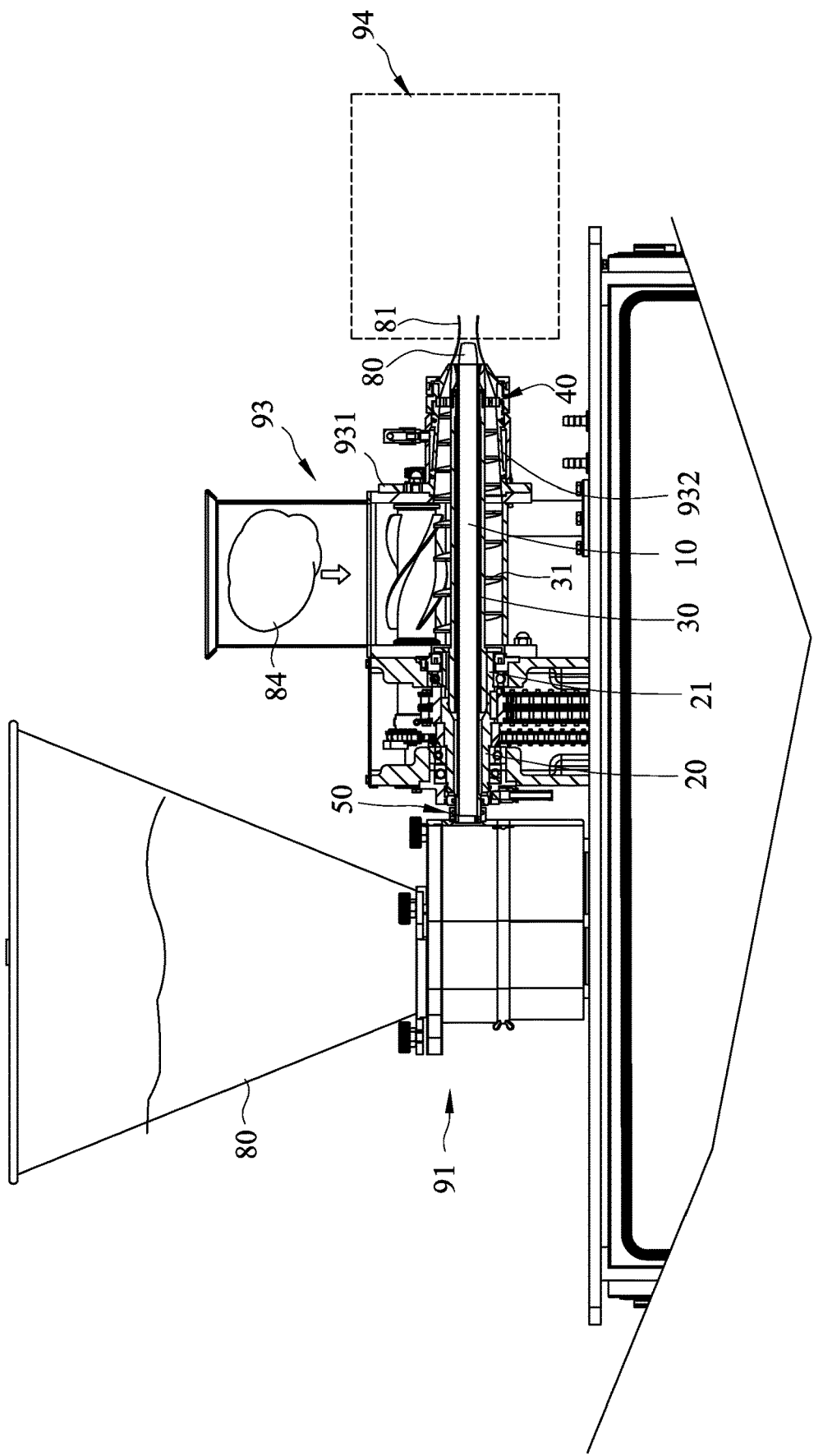
FIG. 5 is a schematic view demonstrating an operation of use of the present invention.
Figure 6:
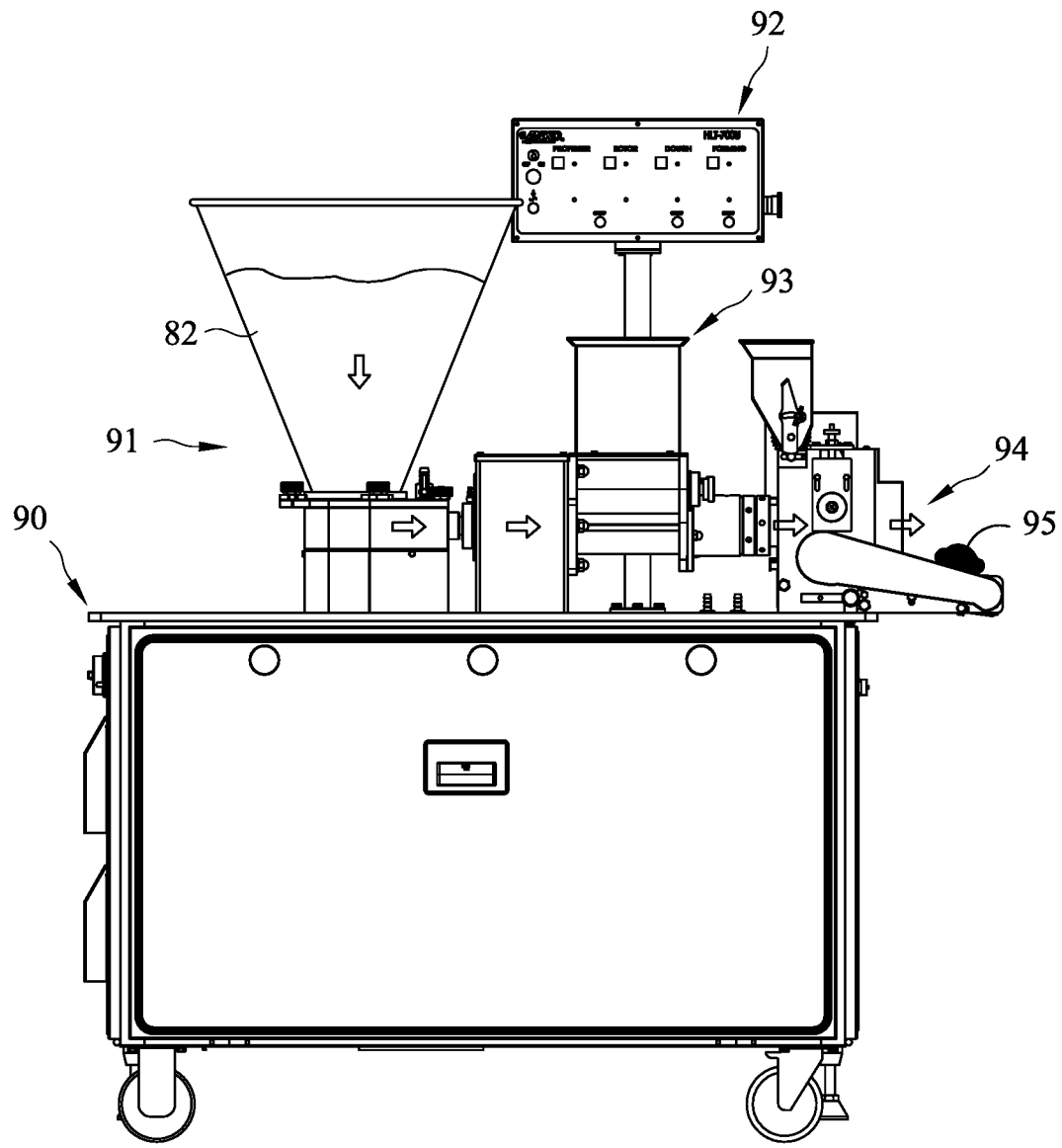
FIG. 6 is a schematic view illustrating an overall structural arrangement of a prior art dough food product stuffing machine.
Figure 7:
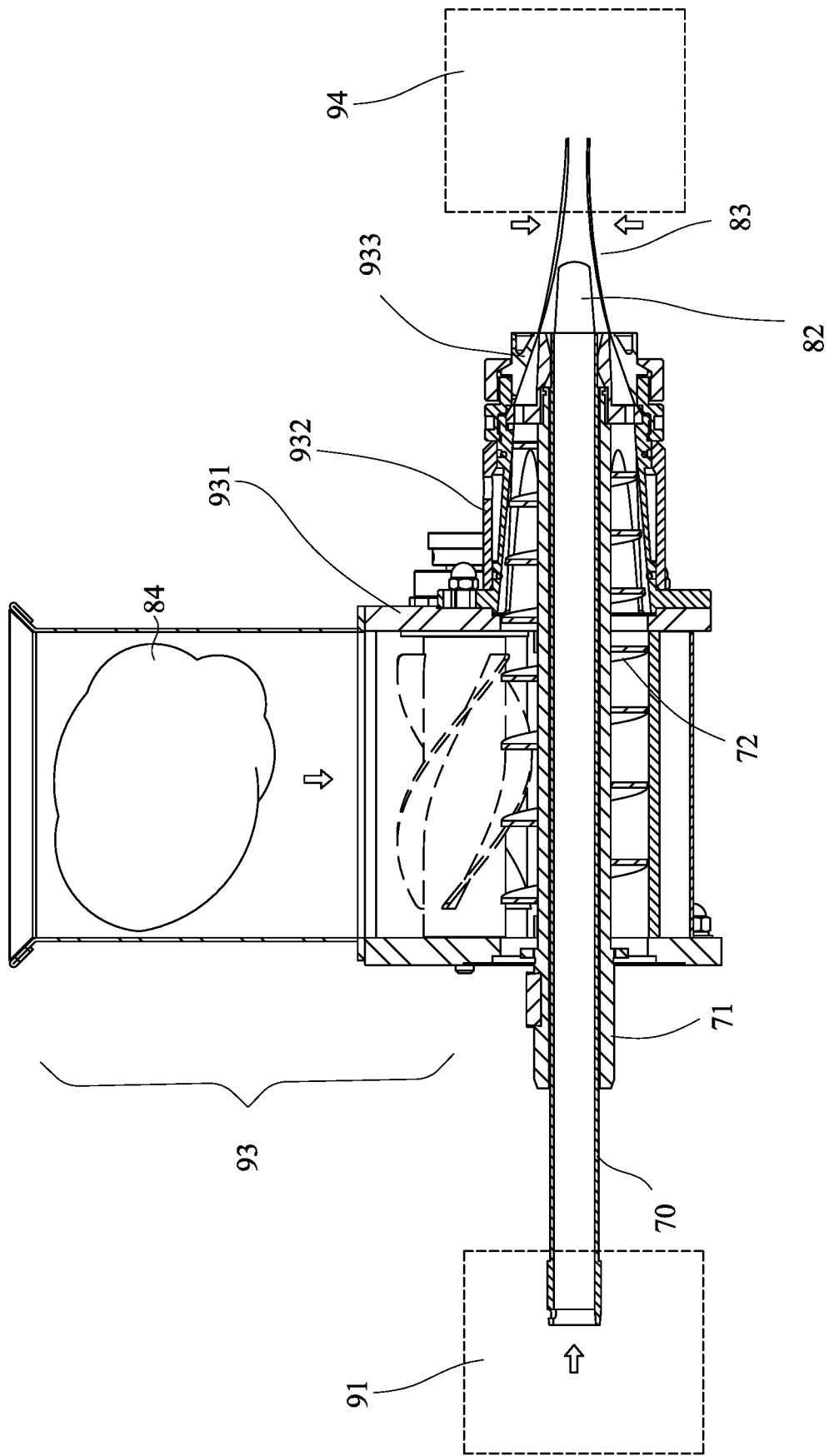
FIG. 7 is a schematic view illustrating a stuffing operation carried out in the prior art dough food product machine.

As shown in FIGS. 2, 3, and 5, a dough driving rod 30, which is a hollow member, is fit outside and sleeved over the stuffing conveyance pipe 10 and has an end connected to the fitting seat 21 of the shaft sleeve 20 and an opposite end received in and connected to a dough discharge tube 932 of a dough trough 931 of the dough feeding unit 93, and is fit with a screw rod support enclosure 40 that includes sieve apertures 41, so that the shaft sleeve 20, once driven, causes the dough driving rod 30 to simultaneously rotate in the dough trough 931 to allow a blade 31 to knead and push and compress a dough block 84 to form a dough skin 81. The shaft sleeve 20 and the stuffing conveyance pipe 10 collectively form a first passage 1020 in an annular space therebetween. The dough driving rod 30 and the stuffing conveyance pipe 10 collectively form a second passage 1030 in an annular space therebetween. The screw rod support enclosure 40 and the stuffing conveyance pipe 10 collectively form a third passage 1040 in an annular space therebetween.

As shown in FIGS. 1 and 2, a gas supply unit 60 supplies gas, such as air, through piping 61 to sequentially feed into the first passage 1020, the second passage 1030, and the third passage 1040 to be ejected from an outer circumference of the stuffing conveyance pipe 10. In an embodiment, the gas supply unit 60 is connected to the outside and air is drawn in by means of natural intake. As such, airflow may be sucked during shaping of the dough skin to prevent the dough skin from wrinkling or even collapsing. Alternatively, air or gas may be supplied in a pressurized manner.

As shown in FIGS. 1, 2, and 5, when a stuffing material 80 is being fed from the stuffing feeding unit 91 into the stuffing conveyance pipe 10, a dough block 84 is kneaded and compressed in the dough trough 931 of the dough feeding unit 93 by the dough driving rod 30 and is discharged through the dough discharge tube 932 and the screw rod support enclosure 40 to form a dough skin 81. Air or gas that may be supplied from the gas supply unit 60 to flow through the piping 61, the first passage 1020, the second passage 1030, and the third passage 1040 and is then ejected from the outer circumference of the stuffing conveyance pipe 10 destroys vacuum generated in an interior of the dough skin 81 by the shaping unit 94 so as to prevent the dough skin from wrinkling or even collapsing before being properly shaped, and also to guide or allow the stuffing material 80 to more smoothly move into the interior of the dough skin 81, making the dough skin 81 fully filled with and enclosing the stuffing material 80 to be subsequently fed to the shaping unit 94 for cutting or trimming into a dumpling or any similar stuffed dough food product, and as such, a food product that shows a fully filled and thus rounded appearance, providing a good appealing for purchasers, is completed. The taste of the stuffed dough food product is also made better.

In an embodiment, a material injection unit 62 may be additionally provided to fill in seasonings, oil/fat, and pigment that are mixed with the gas or air supplied from the gas supply unit 60 to achieve addition of oil, seasonings, and pigments of different kinds or flavors in the dough skin 81 and the stuffing material 80 for diversification of stuffed dough food products.

In an embodiment, as shown in FIG. 2, the sealing flange 50 is provided with a guide hole 51. One end of the guide hole 51 is connected to the piping 61 of the gas supply unit 60, and an opposite end is in direct communication with the first passage 1020 to achieve a desired operation of the gas/air charging system.

Figure 4:
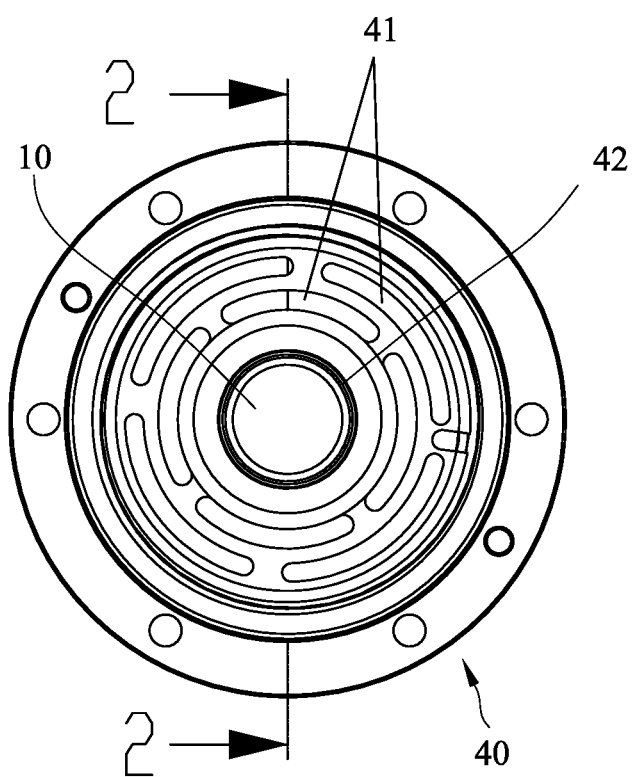
FIG. 4 is an end view of the present invention.

As shown in FIGS. 2, 3, and 4, in the present invention, the screw rod support enclosure 40 that is arranged at an end section of the dough driving rod 30 is provided with an axial hole 42 formed in a center thereof to fit to an end part of the stuffing conveyance pipe 10 and the dough driving rod 30. The sieve apertures 41 include multiple arc slots extending circumferentially along a circumferential rim of an end surface of the axial hole 42 so that, as shown in FIG. 5, the dough skin 81, when extruded out, would form a dough skin of multiple layers or sections of sealing, making it easy to shape and providing good taste.

As shown in FIGS. 2 and 3, although in the embodiment illustrated, the stuffing conveyance pipe 10, the shaft sleeve 20, and the screw rod support enclosure 40 are arranged as three separate pieces, they can be formed integrally, by following any known techniques, as a unitary structure, such that the first passage 1020, the second passage 1030, and the third passage 1040 are integrally jointed as a unitary passage. This is a variation of this invention that is readily appreciated.

The present invention provides the following advantages in use:

(1) The present invention provides passages, preferably in an annular form, between an outer circumference of the stuffing material conveyance pipe and the shaft sleeve, the dough driving rod, and the screw rod support enclosure that are arranged circumferentially around the pipe. The passages are connected to the gas supply unit to receive gas or air supplied from the gas supply unit so that when a stuffing material is filled into a tubular dough skin, the tubular dough skin would be charged and filled with gas or air so as not to collapse, allowing the filling of the stuffing material to reach a more saturated state and can be done in a more smooth way and also making the outside appearance of the stuffed dough food product more appealing and attracting.

(2) Following the above, a material injection unit can be provided in addition to the gas supply unit to add seasonings, oil/fat, and pigment to be mixed with the gas or air supplied from the gas supply unit, to achieve addition of oil, seasonings, and pigments of different kinds or flavors in the dough skin and the stuffing material for diversification of stuffed dough food products.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A stuffing filling and gas charging system of a dough food product machine, at least comprising:
    a stuffing conveyance pipe, which extends through a dough feeding unit of the dough food product machine and has an end connected to a stuffing feeding unit;
    a shaft sleeve, which is sleeved over an end section of the stuffing conveyance pipe that is adjacent to the stuffing feeding unit, an outside diameter of the shaft sleeve being fit in a sealing flange and mounted under the dough feeding unit, an inside diameter of the shaft sleeve being formed with a fitting seat; and
    a dough driving rod, which is hollow and fit over the stuffing conveyance pipe and has an end disposed in and connected to the fitting seat of the shaft sleeve, and an opposite end being connected to a screw rod support enclosure so that the shaft sleeve, when being driven, drives the dough driving rod to simultaneously rotate in a dough trough to allow a blade to knead and extrude a dough block out to form a dough skin;
    wherein a first passage is formed between the shaft sleeve and the stuffing conveyance pipe; a second passage is formed between the dough driving rod and the stuffing conveyance pipe; and a third passage is formed between the screw rod support enclosure and the stuffing conveyance pipe; and
    a gas supply unit, which supplies gas to feed, in sequence, through piping into the first passage, the second passage, and the third passage, to be ejected from an outer circumference of the stuffing conveyance pipe.

2. The stuffing filling and gas charging system according to claim 1, wherein the screw rod support enclosure is formed with an axial hole in a center thereof, and multiple sieve apertures are formed in an outer rim of an end surface of the axial hole, the multiple sieve apertures including arc slots extending circumferentially along a circumference of the axial hole.

3. The stuffing filling and gas charging system according to claim 1, wherein the gas supply unit is connected to a material injection unit.

4. The stuffing filling and gas charging system according to claim 3, wherein the material injection unit is supplied with one of seasoning, oil, and pigment.

5. The stuffing filling and gas charging system according to claim 1, wherein the sealing flange is provided therein with a guide hole, the guide hole having an end connected to the piping of the gas supply unit and an opposite end connected to the first passage.

6. The stuffing filling and gas charging system according to claim 1, wherein the gas supply unit is in communication with the outside and natural intake of air is involved.

7. The stuffing filling and gas charging system according to claim 1, wherein the gas supply unit is in communication with the outside and pressurized air intake is involved.

\* \* \* \* \*